United States Patent [19]

Brown et al.

[11] 3,786,611
[45] Jan. 22, 1974

[54] FASTENING SYSTEM FOR JOINING STRUCTURAL MEMBERS
[75] Inventors: Boyd E. Brown, Hubbard; Eric A. Brown, Portland, both of Oreg.
[73] Assignee: Ordeco, Inc., Woodburn, Oreg.
[22] Filed: Jan. 14, 1972
[21] Appl. No.: 217,854

[52] U.S. Cl.................. 52/753 J, 52/309, 52/585, 52/753 F, 52/758 F
[51] Int. Cl............................................ F16b 5/02
[58] Field of Search. 287/20.92 J, 20.92 F, 20.92 T, 287/20.927, 20.924, 20.92 C, 20.92 W, 20.92 R, 189.36 D, 189.36 F; 52/584, 585, 592, 617, 309, 711

[56] References Cited
UNITED STATES PATENTS
| | | | |
|---|---|---|---|
| 619,516 | 2/1899 | Tillotson | 287/20.92 R |
| 1,351,112 | 8/1920 | Martin | 52/711 X |
| 1,356,348 | 10/1920 | Evans | 52/592 X |
| 2,394,147 | 2/1946 | Brunton et al. | 287/20.92 C X |
| 3,677,874 | 7/1972 | Sterrett et al. | 52/309 X |
| 3,535,842 | 10/1970 | Karn | 52/584 X |
| 2,896,271 | 7/1959 | Kloote et al. | 52/309 X |
| 2,952,947 | 9/1960 | White | 52/711 X |

Primary Examiner—James R. Boler
Assistant Examiner—Wayne L. Shedd
Attorney, Agent, or Firm—Stephen W. Blore et al.

[57] ABSTRACT

Two mold-formed polyurethane foam structural members are joined in edge-abutting relationship at interfitting complementary stepped edges. A threaded fastener extends from an external surface of one member at an oblique angle through an abutting set of edge surfaces of the stepped edges into threaded engagement with a nut embedded within the other so as to draw together the corresponding edge surfaces of the two stepped edges. The nut has wing-like projections which resist its rotation within and withdrawal from such other member. The nut is embedded within its parent member during the mold-forming of such member. Similarly, the required stepped edges and pilot hole leading to the embedded nut are formed as the member is mold-formed. A threaded fastener extending into the mold cavity through a pilot hole in the mold positions the nut within the mold cavity, and a sleeve surrounding the portion of the fastener within the cavity defines the pilot hole to the nut during the mold-forming process.

8 Claims, 4 Drawing Figures

PATENTED JAN 22 1974  3,786,611

FASTENING SYSTEM FOR JOINING STRUCTURAL MEMBERS

BACKGROUND OF THE INVENTION

1. Field of the Invention

The present invention relates to a fastening system and structural joint for joining together in edge-abutting relationship two structural members, and particularly to such a system and joint for edge-joining mold-formed polyurethane foam or other synthetic structurally rigid members.

2. Description of the Prior Art

It has recently been proposed to use structurally rigid polyurethane foam which has been mold-formed to the desired strength, shape and dimensions for structural building components instead of the usual wood or metal components. It has been found feasible to use such polyurethane foam laminate materials for a wide variety of building components, including, for example, exterior siding, interior paneling, flooring, roofing, decking, and such load-bearing components as posts, beams, trusses, columns and the like. In fact, entire wall, floor or roof sections can be mold-formed using a polyurethane foam laminate material. Such synthetic building components can be mold-formed in sections at the factory and then shipped to the job site for assembly. The foregoing materials, components and methods are described in copending patent application Ser. No. 229,071, filed Feb. 24, 1972.

However, the use of such synthetic sectional components involves an entirely new building technique for which conventional fastening systems are unsuited. For example, a fastening system is needed that will enable quick and easy assembly of the various sections of a building component in edge-to-edge relationship without any appreciable visible signs of a joint that would detract from the appearance of the component, particularly in the case of visible components such as exterior siding, interior paneling and exposed beams and posts. Conventional nails are unsuited for this purpose because they develop relatively poor holding strength in the synthetic materials employed and because such large numbers would be required as to detract from what is intended essentially as high production-low cost building system and technique. Conventional bolt fastening systems are unsuited for such building components because they would be exposed to view at both sides of the joint and in their most common usage develop compressive joining forces at their joints in only one direction. Screws are also unsuited for joining members made of synthetic foam materials because they, like nails but to a lesser degree, have poor holding strength in such materials and because unduly large numbers of screws would be required to form a structurally rigid joint.

Thus there is a distinct need for a structural joint and fastening system suitable for edge-joining synthetic foam structural building components quickly, easily and soundly, with no appreciable visibility of the joint along at least one external surface of the structural members to be joined.

SUMMARY OF THE INVENTION

According to the present invention, the foregoing needs unfulfilled by the prior art are provided by a structural joint and fastening system comprising inter-fitting complementary stepped edges on the members to be joined, with one of the members having an embedded nut near its stepped edge and a sleeve-defined pilot hole leading angularly from the nut and intersecting a stepped edge surface of the member at an oblique angle. A continuation of such pilot hole leads from a corresponding stepped edge surface of the mating member to an external surface of such mating member. A fastener threaded into the embedded nut of one member through the angular pilot hole from the external surface of the mating member rigidifies the joint. The pilot hole is provided at an oblique angle such that when the fastener is placed in tension within the members, force components are generated both perpendicular to the mating stepped edge surfaces through which the fastener extends and parallel to such mating stepped edge surfaces in directions whereby all mating edge surfaces of the stepped edges are drawn together in abutting relationship.

According to a method of the invention, the nut is embedded in one of the two members to be joined during the process of mold-forming such structural member. During the mold-forming process, the nut member is held in the desired position within the mold cavity by a threaded bolt extending through the mold and with its threaded end projecting into the mold cavity at the desired angle and to the desired extent. A sleeve is placed over a portion of the bolt extending into the mold cavity to define the pilot hole to be formed within the structural member as the member is formed. With the nut and sleeve thus positioned within the mold cavity, the cavity is filled with polyurethane foam material, whereby the nut member and sleeve become embedded in the material. When the bolt is withdrawn from the nut member after the structural member is thus mold-formed, the sleeve defines the resultant pilot hole in such member. The continuation of such pilot hole in the mating structural member can be either formed during the process of mold-forming such mating member, or can be bored into the mating member after it has been formed.

Primary features of the invention include:

1. a fastening system that enables the assembly of structural members in edge-abutting relationship quickly and easily;

2. a structural joint that is rigid, strong and capable of resisting load-imposed forces in all directions;

3. a structural joint utilizing a blind-type fastening system that is invisible from at least one side of the joint;

4. a fastening system and joint particularly suited for joining together synthetic building components and especially structurally rigid polyurethane foam building components;

5. a fastening system and structural joint which can be assembled and disassembled innumerable times without affecting the strength, rigidity or fit of the joint;

6. a structural joint that develops forces tending to draw together all abutting edge surfaces of the joint;

7. a fastening system and structural joint which enable the edge-to-edge joining together of two members in a direction lengthwise of the joint;

8. a structural joint and fastening system, the major elements of which can be simply and inexpensively formed and positioned in the members to be joined during the manufacture of such members;

9. a structural joint requiring a minimum number of fastening elements to develop the optimum strength and rigidity of the joint;

10. a method of making a structural joint for joining together polyurethane foam and other similar synthetic building components;

11. a fastening system in which the tension of the system creates a resistance to vertical shear between the abutting edges of the joint, and in which the fastener itself resists such shear forces; and 12. a fastening system which enables shielding of the fasteners from heat and cold to prevent transmission of the same via the fasteners into and through the structural members of the joint.

The foregoing and other objects, features and advantages of the present invention will become more apparent from the following detailed description which proceeds with reference to the accompanying drawings, wherein.

DETAILED DESCRIPTION

Figure 1:
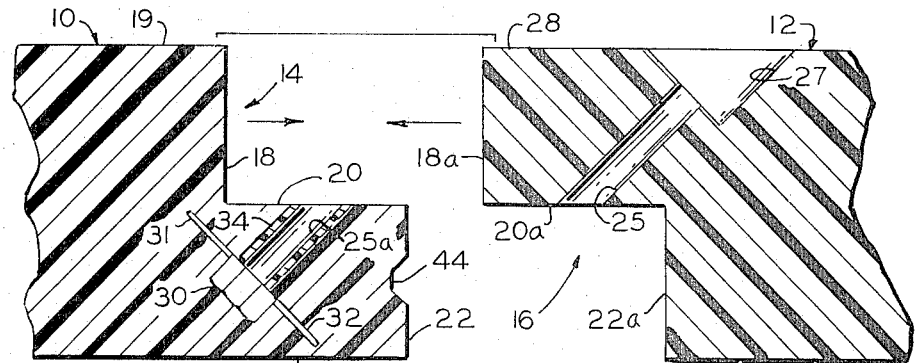
FIG. 1 is a sectional view through the stepped edge portions of two structural members to be joined in accordance with the present invention.
Figure 2:
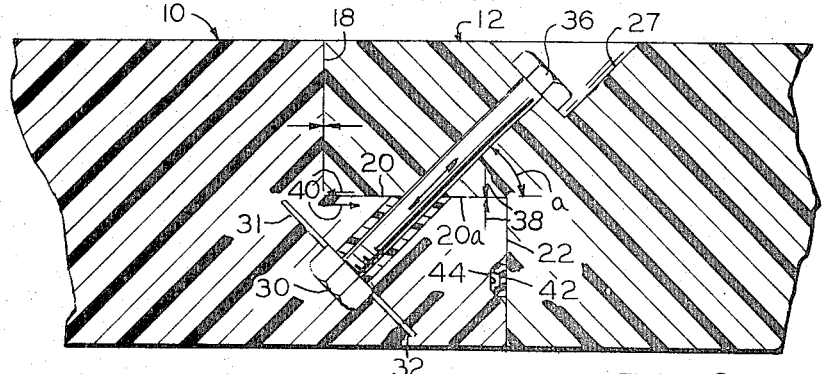
FIG. 2 is a sectional view through a structural joint composed of the members of FIG. 1.

With reference to the drawings, two structural members to be joined, such as the pair of panel sections 10, 12, shown in FIG. 1, have complementary stepped edges 14, 16 at their edges to be joined. Such stepped edges are adapted to interfit with one another as shown in FIG. 2 to form uninterrupted continuations of the external surfaces of the panels when they are joined.

Each stepped edge includes three edge surfaces adapted to abut corresponding edge surfaces of the other panel. Such edge surfaces on panel 10 include a first edge surface 18 extending perpendicular to and intersecting a top external surface 19 of the panel, a second edge surface 20 extending parallel to external surface 19 and intersecting edge surface 18 at a right angle, and a third edge surface 22 intersecting edge surface 20 and a bottom external surface 23 at right angles. The stepped edge 16 of mating panel 12 is provided with corresponding edge surfaces 18a, 20a, 22a.

The illustrated panels are mold-formed of a structurally rigid synthetic material such as a rigid polyurethane foam. A method of manufacturing such building components of polyurethane foam is described in the previously mentioned copending application Ser. No. 229,071 filed Feb. 24, 1972. Such method is also described briefly hereinafter in describing the method of forming the elements of the fastening system and joint.

The present structural joint and fastening system, although especially suitable for use with such polyurethane foam building components and building assembly techniques are also used advantageously in edge-joining any mold-formed members.

Referring to FIG. 1, panel 12 is provided with a pilot hole 25 extending from an enlarged countersunk opening 27 at an external surface 28 angularly to stepped edge surface 20a, intersecting such surface at an oblique angle. A continuation 25a of pilot hole 25 extends from the corresponding stepped edge surface 20 of panel 10 into the interior of such panel, terminating at an embedded nut member 30 adjacent to its stepped edge. Pilot holes 25 and 25a are positioned so as to be axially aligned with one another when the stepped edges of the panels are interfitted, as shown in FIG. 2. Embedded nut 30 has a threaded internal opening (not shown) axially aligned with pilot hole 25a.

The embedded nut is also provided with means to resist rotation of the nut within the synthetic material of its panel and to resist its withdrawal from such panel. Such inhibiting means includes a pair of wing-like projections 31, 32 radiating from the nut. Although the winged porjections 31, 32 are shown in the plane of the section of the panel shown, in practice they would be more advantageously positioned at 90° to such plane so as to avoid the possibility of one of the wings penetrating the lower surface 23 of the panel.

The pilot hole portion 25a within panel 10 is defined by an embedded sleeve 34 extending from one end abutting embedded nut 30 to a beveled opposite end at stepped edge surface 20. This sleeve is used to form pilot hole portion 25a during the mold-forming of the panel section 10 as described hereinafter. Pilot hole 25 in mating panel section 12 may be formed either during the mold-forming of such panel section, or may be drilled through such section after the panel is formed using an appropriate jig for proper location of the hole.

The structural joint is formed by interfitting the stepped edges of panel sections 10 and 12, inserting a bolt-type threaded fastener 36 into the pilot holes 25, 25a from surface opening 27, and driving the bolt into threaded engagement with nut member 30 until the bolt is placed in tension within the member. As will be apparent from FIG. 2, by reason of the oblique angle of pilot holes 25, 25a, the bolt is placed in tension at an angle a to the mating set of edge surfaces 20, 20a through which the bolt extends such that force components are generated tending to draw all corresponding edge surfaces of the two stepped edges into abutment with one another. That is, a first set of force components, indicated by arrows 38, is produced in a direction perpendicular to the mating edge surfaces 20, 20a tending to draw them together. At the same time a second set of force components, indicated by arrows 40, are generated in directions parallel to edge surfaces 20, 20a tending to draw the mating sets of vertical edge surfaces 18, 18a and 22, 22a into abutment with one another. The result is an exceedingly strong, rigid joint capable of resisting and transmitting external loads and internal stresses in all directions.

Although oblique angle a is shown at 45°, which produces force components 38, 40 of equal magnitude, such angle is not critical. Other oblique angles producing force components of substantial magnitude both perpendicular and parallel to the mating stepped edge surfaces through which the bolt extends can be used, depending on the design requirements of the joint and the intended function of the members to be joined.

An important feature of the invention made possible by the oblique angle of the fastener with respect to the stepped edge surfaces through which it extends is the ability to position the panel sections to be joined in edge-to-edge abutting relationship by moving the panels toward one another in the plane of the panels rather than in the direction laterally of such plane.

If desired, after the bolt is driven home into nut 30, the countersunk surface opening 27 may be filled, thereby providing a joint having no exposed fasteners and a nearly invisible parting line at the joint.

Also if desired, the joint may be made water-tight by providing a seal 42 as shown in FIG. 2 within a seal groove 44 provided for this purpose in edge surface 22 of panel member 10. This groove can be formed during the mold-forming of the panel member itself.

METHOD OF MANUFACTURE

Figure 3:
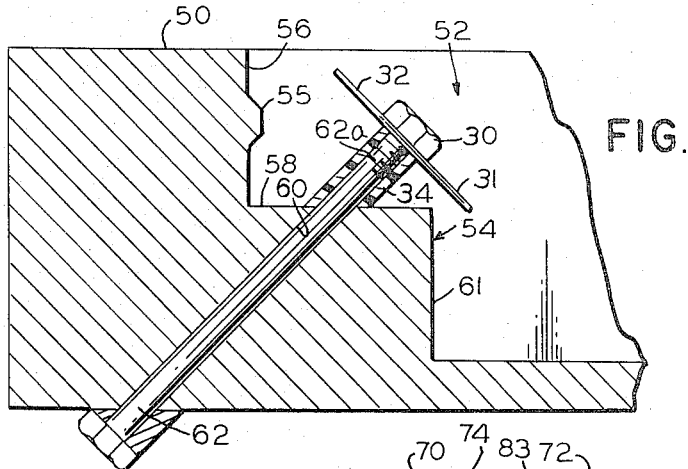
FIG. 3 illustrates a method of making one component of the structural joint of FIG. 2.

The method of manufacturing a mold-formed structural member of polyurethane foam having a stepped edge with embedded nut corresponding to the panel section 10 of FIGS. 1 and 2 is illustrated in FIG. 3. First, a mold 50 is provided with an upwardly opening mold cavity 52 defining the shape of the panel section or other structural member to be formed in the mold. The mold frame may be made of wood and then lined with a suitable silicone material to enable ready release of the polyurethane foam panel after it is formed in the mold.

The mold is provided with a stepped edge wall 54 corresponding to the desired configuration of the stepped edge to be formed in the panel, in this case corresponding to the shape of stepped edge 14 of panel section 10. Thus in FIG. 3 the mold edge wall section 56 corresponds to stepped edge surface 22 of panel section 10 and includes a projecting ridge 55 which forms the seal groove 44. The mold edge wall section 58 corresponds to edge surface 20 of panel 10 and mold edge wall section 61 corresponds to the panel edge surface 18.

A pilot hole 60 is drilled at an oblique angle, in this case, 45°, upwardly through the bottom of mold 50 as as to intersect mold edge wall 58 at the desired oblique angle and position corresponding to the angle and position of pilot hole 25 in panel section 12. A threaded bolt 62 is inserted through the mold pilot hole so that the bolt's threaded end portion 62a projects into the mold cavity 52 to the desired extent. Then sleeve member 34 is slipped over the end of fastener portion 62a to surround a portion of the fastener extending from mold edge surface 58 into the cavity but leaving an exposed threaded end of the fastener for receiving nut 30. Sleeve 34 is beveled at its intersection with mold edge wall 58 so as to seal the otherwise exposed portion of the fastener within the cavity from the synthetic material used to fill the mold. Thereafter nut 30 is threaded onto the end of the fastener and into abutment with sleeve 34, to maintain the nut at its desired position and orientation within the mold cavity.

With the nut and sleeve thus positioned, mold cavity 52 is filled to the desired level with the synthetic material from which the panel section is to be formed, in this case polyurethane foam. The polyurethane foam is most advantageously sprayed into the mold cavity in layers of varying density to achieve desired strength and insulating characteristics. Filling of the cavity continues until nut 30 is fully embedded within the synthetic material and a member is formed to the desired thickness.

After the molded material has set, the fastener 62 is simply unthreaded from nut 30 and withdrawn from pilot hole 60, leaving sleeve 34 and nut 30 embedded within the polyurethane foam-filled mold cavity. The resultant panel section 10 can then be withdrawn from the mold.

In the foregoing process of mold-forming the panel, the stepped edge, embedded nut, and pilot hole elements of the described joint and fastening system are formed and positioned.

The panel section 12 would be mold-formed according to a process similar to that just described with respect to panel section 10. In this regard, the pilot hole 25 and countersunk surface opening 27 can be formed during the mold-forming of the panel section, if desired, using a suitable sleeve member to define the pilot hole 25 during the cavity-filling process, in a manner similar to that by which sleeve 34 was used to form the pilot hole 25a in panel 10. Alternatively, pilot hole portion 25 in panel section 12 can also be formed after the panel has been mold-formed by drilling, using a suitable jig for proper positioning of the hole.

Figure 4:
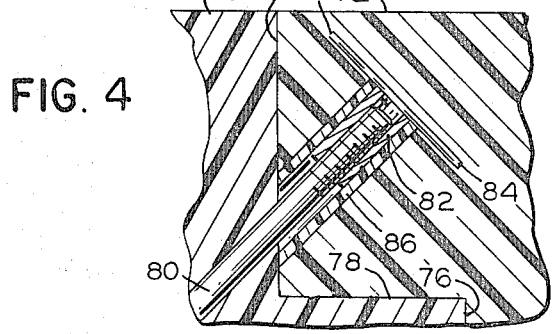
FIG. 4 illustrates a modified form of the structural joint of FIG. 2.

FIG. 4 Modification

FIG. 4 discloses a structural joint in accordance with the invention employing a slightly different stepped edge configuration than that shown in FIG. 1 and a slightly different sleeve and embedded nut configuration. In FIG. 4 structural members 70, 72 are provided with long, vertical stepped edge surfaces 74, 76 and a short intermediate horizontal stepped edge surface 78. In this form of joint the threaded fastener 80 extends through mating vertical edge surfaces 74 of the members 70, 72 to be joined rather than through the horizontal edge surfaces as before.

Furthermore, a longer and thinner nut member 82 than that used in the FIG. 2 form of the invention is embedded in member 72. Projecting wings 83, 84 to inhibit rotation and withdrawal of the nut member from the structural member are provided at the uppermost end of nut 82. In this case, the sleeve member 86 extends from the stepped edge surface 74 through which the fastener extends in surrounding relationship to both the bolt 80 and nut member 82. Whether or not the sleeve is placed in surrounding relationship to the nut depends solely on the nut configuration and size as compared to that of the sleeve member.

It has been found in practice that bolt and nut alignment problems can be avoided by the use of a lag bolt-type of threaded fastener in conjunction with a nut member made from a coil of heavy wire. Nut members of this general type are sold commercially under the name of "Burke Coil Tie," manufactured by the Burke Concrete Company.

Although the structural joints are shown with stepped edges having their three edge surfaces at right angles to one another and to the external surfaces of the structural members to be joined, other stepped edge configurations can be employed successfully in the joint of this invention so long as the threaded fastener tying the joint together extends through one set of the stepped edge surfaces at an oblique angle as previously described, to generate force components both normal and parallel to such edge surfaces in directions tending to draw all mating stepped edge surfaces of the joint together. The number of stepped edge configurations suitable for this purpose are limited somewhat, however, by the need for providing access to the driving head of the fastener at an external surface of one of the members to be joined.

Having illustrrated and described what are presently preferred forms of the invention, it should be apparent to those skilled in the art that the same permit of modification in arrangement and detail. We claim as our invention all such modifications as come within the true spirit and scope of the following claims.

We claim:

1. A structural joint for joining together in edge-abutting relationship a pair of structurally rigid synthetic foam structural panel members comprising:

a first stepped edge on one of said pair of panel members defined by at least three intersecting stepped edge surfaces, a second stepped edge on the other of said pair of panel members having intersecting edge surfaces complementary to and in abutment with said intersecting edge surfaces of said first stepped edge, a straight pilot hole extending at an oblique angle from one face surface of said one panel member adjacent its stepped edge through said one panel member and through the said other abutting set of said stepped edge surfaces at an oblique angle to said surfaces and angularly into said other panel member and terminating within said other panel member short of the face surface thereof opposite said one face surface, a threaded non-expansible nut member embedded within said other panel member at the terminus of and in axial alignment with said pilot hole within said other panel member, said nut member including integral generally radially extending projection means extending into said other panel member from exterior portions thereof for restraining said nut member against rotation within and withdrawal from said other panel member, a sleeve member embedded angularly within said other panel member in coaxial surrounding relationship to said pilot hole and defining the radially outer limits of said pilot hole, said sleeve extending lengthwise continuously from said nut member at one end of said sleeve to said abutting set of edge surfaces at the opposite end thereof, and a tensioned threaded fastener extending from said one face surface of said one panel member substantially coaxially through said pilot hole and into threaded engagement with said embedded nut member thereby fastening said panel members together at said stepped edges with all three said intersecting stepped edge surfaces of said one panel member being forced compressively into contact against the corresponding abutting stepped edge surfaces of said other panel member.

2. A joint according to claim 1 wherein said sleeve member coaxially surrounds said nut member.

3. A joint according to claim 1 wherein said sleeve member and said nut member are in end-abutting relationship to one another.

4. A system according to claim 1 wherein each said stepped edge includes two edge surfaces extending parallel to one another and intersecting opposed external surfaces of said member, said parallel edge surfaces being joined together by a third edge surface extending generally in a direction of said external surfaces.

5. A system according to claim 1 wherein said edge surfaces of a stepped edge intersect at right angles to one another.

6. A system according to claim 1 wherein each said structural member includes a pair of opposed parallel external surfaces, said stepped edge of each member including a first stepped edge intersecting one external surface at a right angle, a second stepped edge intersecting the opposed external surface at a right angle, and a third edge surface intersecting said first and second edge surfaces at right angles.

7. A system according to claim 6 wherein said pilot hole extends at an oblique angle across said third edge surface.

8. A system according to claim 6 wherein said pilot hole extends across one of said first and second edge surfaces at an oblique angle.

* * * * *